(12) United States Patent
Bultitude et al.

(10) Patent No.: US 8,238,075 B2
(45) Date of Patent: Aug. 7, 2012

(54) HIGH VOLTAGE CAPACITORS

(75) Inventors: John Bultitude, Greenville, SC (US); John Jiang, Milford, CT (US); John Rogers, Seymour, CT (US)

(73) Assignee: Vishay Sprague, Inc., Sanford, ME (US)

( * ) Notice: Subject to any disclaimer, the term of this patent is extended or adjusted under 35 U.S.C. 154(b) by 766 days.

(21) Appl. No.: 12/189,492

(22) Filed: Aug. 11, 2008

(65) Prior Publication Data

US 2009/0052111 A1    Feb. 26, 2009

Related U.S. Application Data

(63) Continuation-in-part of application No. 11/359,711, filed on Feb. 22, 2006, now Pat. No. 7,336,475.

(51) Int. Cl.
*H01G 4/005* (2006.01)
*H01G 4/06* (2006.01)

(52) U.S. Cl. .................................... 361/303; 361/311

(58) Field of Classification Search ................ 361/303, 361/305, 311–313, 306.1, 306.3, 301.4
See application file for complete search history.

(56) References Cited

U.S. PATENT DOCUMENTS

| | | | |
|---|---|---|---|
| 3,683,469 A | 8/1972 | Capek et al. | |
| 4,731,697 A | 3/1988 | McLarney | |
| 5,590,016 A | 12/1996 | Fujishiro et al. | |
| 5,835,338 A | 11/1998 | Suzuki et al. | |
| 6,331,930 B1 | 12/2001 | Kuroda et al. | |
| 6,515,842 B1 | 2/2003 | Hayworth et al. | |
| 6,627,509 B2 | 9/2003 | Duva | |
| 6,760,215 B2 | 7/2004 | Devoe | |
| 6,829,135 B2 | 12/2004 | Honda et al. | |
| 6,842,327 B1 | 1/2005 | Diorio et al. | |
| 6,898,071 B2 | 5/2005 | Kirsten | |
| 6,903,918 B1 | 6/2005 | Brennan | |

(Continued)

FOREIGN PATENT DOCUMENTS

| | | |
|---|---|---|
| JP | 4-302118 | 10/1992 |
| JP | 8-169788 | 7/1996 |
| JP | 2000-133545 | 5/2000 |

OTHER PUBLICATIONS

International Search Report, PCT/US06/23338, Vishay Vitramon, Incorporated, Jul. 12, 2007, 2 pages.

*Primary Examiner* — Eric Thomas
(74) *Attorney, Agent, or Firm* — Volpe and Koenig, P.C.

(57) ABSTRACT

A capacitor includes a ceramic capacitor body having opposite ends and comprised of a plurality of electrode layers and dielectric layers and first and second external terminals attached to the ceramic capacitor body. The internal active electrodes within the ceramic capacitor body are configured in an alternating manner. Internal electrode shields within the ceramic capacitor body are used to assist in providing resistance to arc-over. The shields may include a top internal electrode shield and an opposite bottom internal electrode shield wherein the top internal electrode shield and the opposite bottom internal electrode shield are on opposite sides of the plurality of internal active electrodes and each internal electrode shield extends inwardly to or beyond a corresponding external terminal to thereby provide shielding. Side shields are used. The capacitor provides improved resistance to arc-over, high voltage breakdown in air, and allows for small case size. To further increase voltage breakdown, a coating on the ceramic capacitor may be used.

40 Claims, 11 Drawing Sheets

U.S. PATENT DOCUMENTS

| | | |
|---|---|---|
| 6,912,115 B2 | 6/2005 | Kobayashi et al. |
| 6,940,707 B2 | 9/2005 | Nakatani et al. |
| 7,193,862 B2 | 3/2007 | Maekawa et al. |
| 7,336,475 B2 | 2/2008 | Bultitude et al. |
| 7,685,703 B1 | 3/2010 | Devoe et al. |
| 7,715,171 B2 | 5/2010 | Nakano et al. |
| 7,828,033 B2 | 11/2010 | Aoki |
| 2003/0099084 A1* | 5/2003 | Duva .................. 361/306.3 |
| 2009/0052112 A1 | 2/2009 | Bultitude et al. |

* cited by examiner

| Example | 1 | 2 | 3 |
|---|---|---|---|
| Design Description | Standard Design | Top/Bottom Shields | Top/Bottom + Side Shields |
| Fired Active Thickness " | 0.0020 | 0.0020 | 0.0020 |
| Fired Active Thickness microns | 51 | 51 | 51 |
| Number of Actives | 26 | 27 | 28 |

Electrode Layout Plan:
Electrode #1, Electrode #2, Electrode #3, Electrode #4, More Electrodes, Electrode #N-1, Electrode #N — with Top Shield and Bottom Shield and Side Shields configurations (reference numerals 20, 22, 24, 26, 28, 30, 32, 34, 36, 38, 40, 42, 44, 46, 48, 50, 52, 54, 56, 58, 60, 62, 64, 66, 68, 70).

*Fig.6*

| Example | 1 | 2 | 3 |
|---|---|---|---|
| Description | Standard Design | Top/Bottom Shields | Top/Bottom & Side Shields |
| Average Capacitance nF | 34.4 | 31.9 | 24.5 |
| Average Length " | 0.1262 | 0.1261 | 0.1256 |
| Average Length mm | 3.21 | 3.20 | 3.19 |
| Average width " | 0.0643 | 0.0644 | 0.0682 |
| Average width mm | 1.63 | 1.64 | 1.73 |
| Average Thickness " | 0.0603 | 0.0620 | 0.0636 |
| Average Thickness mm | 1.53 | 1.57 | 1.62 |

*Fig.7*

HIGH VOLTAGE CAPACITORS

PRIORITY STATEMENT

This is a Continuation-in-Part Application filed under 35 U.S.C. §111(a) and claiming the benefit under 35 U.S.C. §120 of PCT Application No. PCT/US06/23338, filed Jun. 15, 2006, which claims priority to U.S. Ser. No. 11/359,711 filed Feb. 22, 2006, and now U.S. Pat. No. 7,336,475, the foregoing applications are herein incorporated by reference.

BACKGROUND OF THE INVENTION

Multilayer ceramic capacitors generally have alternating layers of ceramic dielectric material and conductive electrodes. Various types of dielectric materials can be used and various types of physical configurations have been used. Capacitors for high voltage performance have been produced for many years using a "series design". In the series design the charge is stored between the floating electrode and electrodes connected to the terminals on either side as shown for a single floating electrode designs in FIG. 1. This compares to a standard capacitor design shown in FIG. 2 in which the electrodes alternatively connect to different terminals and the charge is stored between these electrodes. The capacitance for these designs is given by:

$$C = \epsilon_o \epsilon_r A N / T$$

Where
C=Capacitance in F
$\epsilon_o$=Permittivity of Free Space=$8.854 \times 10^{-12}$ Fm$^{-1}$
$\epsilon_r$=Permittivity of the Ceramic Material, a material dependent dimensionless constant
A=Effective Overlap Area of Electrodes m$^2$
N=Number of electrodes−1
T=Fired Active Thickness of Ceramic Separating the Layers However, in the case of the series design the effective overlap area is significantly reduced. The advantage of the series design is that the internal voltage acting on the electrodes is halved for the single floating electrode. It is possible to further separate the floating electrode to give more than one floating electrode per layer to reduce the internal voltage but this also lowers the effective overlap area reducing capacitance. The average voltage breakdowns (n=50) for 27 lots of case size 1812 MLCCs, 47 nF±10% standard designs and the same number of case size 1812, 22 nF±10% single floating electrode series designs are shown in FIG. 3. In all these cases the fired active thickness separating the electrodes was 0.0023", 58 microns with an overall thickness of 0.051±0.003" (1.30±0.08 mm) for the standard design and 0.068±0.003" (1.73±0.08 mm) for the series capacitors. The length and width dimensions were 0.177±0.010" (4.50±0.25 mm) and 0.126±0.008" (3.20±0.20 mm) respectively for all these 1812 case size capacitors. Cross-sections of the 1812 standard design and the single electrode series design are shown in FIGS. 4 and 5 respectively.

In addition to the internal voltage withstanding capability of these MLCCs it is also critical that these parts are resistant to arc-over from the capacitor terminals. U.S. Pat. No. 4,731,697, to McLarney discloses a surface electrode with portions of the margin covered by a further dielectric layer to prevent arc over that requires laser trimming. However, it is important to note that exposed electrodes are subject to corrosion. Also the properties of exposed electrodes are significantly impacted by the environment factors, such as humidity, limiting the applications in which these capacitors can be used. U.S. Pat. No. 6,627,509 to Duva discloses a method for producing surface flashover resistant capacitors by applying a para-poly-xylylene coating to the surface of multilayer ceramic capacitors followed by trimming the excess material from the terminals. In this case significant costs are associated with coating of the capacitors. Furthermore, the coating may not be compatible with the circuit board assembly processes and the presence of organic coatings in some electronic application such as satellites is limited because of out gassing concerns.

Thus, despite various efforts to reduce produce capacitors with high voltage breakdown and which minimize occurrence of arc over, problems remain. What is needed is an improved high voltage capacitor.

BRIEF SUMMARY OF THE INVENTION

Therefore, it is a primary object, feature, or advantage of the present invention to improve upon the state of the art.

It is a further object, feature, or advantage of the present invention to provide a multilayer ceramic capacitor which is resistant to arc-over.

It is a still further object, feature, or advantage of the present invention to provide a multilayer ceramic capacitor with high voltage breakdown in air.

A still further object, feature, or advantage of the present invention is to provide a multilayer ceramic capacitor with a design which retains high capacitance.

Another object, feature, or advantage of the present invention is to minimize the occurrence of unwanted disruptions due to arc-over when the capacitor is incorporated into an electronic circuit.

Yet another object, feature, or advantage of the present invention is to provide a capacitor with high voltage withstanding capability with a smaller case size allowing for miniaturization of circuits.

A further object, feature, or advantage of the present invention is to provide an improved capacitor which can be manufactured conveniently and economically.

One or more of these and/or other objects, features, or advantages of the present invention will become apparent from the specification and claims that follow.

According to one aspect of the present invention, a multilayer ceramic capacitor component is provided. The capacitor component includes a ceramic capacitor body having opposite ends and comprised of a plurality of electrode layers and dielectric layers. The capacitor component further includes first and second external terminals attached to the ceramic capacitor body. The capacitor component also includes a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly. There is also a plurality of internal electrode shields within the ceramic capacitor body to thereby assist in providing resistance to arc-over. The plurality of internal electrode shields include a top internal electrode shield and an opposite bottom internal electrode shield wherein the top internal electrode shield and the opposite bottom internal electrode shield are on opposite sides of the plurality of internal active electrodes and each internal electrode shield extends inwardly to or beyond a corresponding external terminal to thereby provide shielding. There are also side shields. Each side shield extends inwardly from one end of the capacitor body and the side shields are configured to further shield an active electrode to thereby further resist arc over between active electrodes and terminals. A coating is on the ceramic capacitor body to assist in increasing breakdown voltage.

According to another aspect of the present invention, a multilayer ceramic capacitor component for providing improved high voltage characteristics is provided. The capacitor includes a ceramic capacitor body having opposite ends and comprised of a plurality of electrode layers and dielectric layers. First and second external terminals are attached to the ceramic capacitor body. The plurality of electrode layers include a top layer having an electrode shield extending inwardly to or beyond the first terminal, a bottom layer having an electrode shield extending inwardly to or beyond the second terminal, and a plurality of alternating layers of active electrodes extending inwardly from alternating ends of the ceramic capacitor body. Each of the alternating layers of active electrodes also includes side shields. A coating on the ceramic capacitor body assists in increasing breakdown voltage.

According to another aspect of the present invention a method of manufacturing a multilayer ceramic component is provided. The method includes forming a ceramic capacitor body from a plurality of electrode layers and dielectric layers and attaching first and second external terminals on opposite ends of the ceramic capacitor body. The plurality of electrode layers comprises layers of active electrodes and layers of shielding electrodes and wherein the layers of active electrodes are configured in an alternating manner such that a first of the plurality of active electrodes extends from one end of the ceramic capacitor body inwardly and a next internal active electrode extends from an opposite end of the ceramic capacitor body inwardly. The layers of shielding electrodes include a top internal electrode shield and an opposite bottom internal electrode shield wherein the top internal electrode shield and the opposite bottom internal electrode shield are on opposite sides of the plurality of active electrodes and each electrode shield extends inwardly to or beyond a corresponding external terminal to thereby provide shielding. The layers of active electrodes also include layers of side shields on opposite sides of the active electrodes to thereby provide additional shielding. A coating on the ceramic capacitor body assists in increasing breakdown voltage.

A multilayer ceramic capacitor component comprising a ceramic capacitor body having opposite ends and comprised of a plurality of electrode layers and dielectric layers; first and second external terminals attached to the ceramic capacitor body; a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly; a plurality of internal electrode shields within the ceramic capacitor body to thereby assist in providing resistance to arc-over; the plurality of internal electrode shields comprising a plurality of side shields, each side shield extending inwardly from one end of the capacitor body and the side shields configured to shield a corresponding active electrode to thereby resist arc over between active electrodes and terminals; and a coating on the ceramic capacitor body to assist in increasing breakdown voltage.

A method of manufacturing a multilayer ceramic component, comprising forming a ceramic capacitor body from a plurality of electrode layers and dielectric layers; attaching first and second external terminals on opposite ends of the ceramic capacitor body; coating the ceramic capacitor body; wherein the plurality of electrode layers comprises layers of active electrodes and layers of shielding electrodes and wherein the layers of active electrodes being configured in an alternating manner such that a first of the plurality of active electrodes extends from one end of the ceramic capacitor body inwardly and a next internal active electrode extends from an opposite end of the ceramic capacitor body inwardly; wherein the layers of active electrodes further comprise layers of side shields on opposite sides of the active electrodes to thereby provide shielding.

A multilayer ceramic capacitor component comprising a ceramic capacitor body having opposite ends and comprised of a plurality of electrode layers and dielectric layers; first and second external terminals attached to the ceramic capacitor body; a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly; a plurality of internal electrode shields within the ceramic capacitor body to thereby assist in providing resistance to arc-over; each of the internal electrode shield extends inwardly to or beyond a corresponding external terminal to thereby provide shielding; the plurality of internal electrode shields comprising a plurality of side shields, each side shield extending inwardly from one end of the capacitor body and the side shields configured to shield the internal active electrode to thereby further resist arc over between the internal active electrodes and the terminals; and a coating on the ceramic capacitor body to assist in increasing breakdown voltage.

A multilayer ceramic capacitor component for providing improved high voltage characteristics, comprising a ceramic capacitor body having opposite ends and comprised of a plurality of electrode layers and dielectric layers; first and second external terminals attached to the ceramic capacitor body; wherein the plurality of electrode layers comprise a top layer having an electrode shield extending inwardly to or beyond the first terminal, a bottom layer having an electrode shield extending inwardly to or beyond the second terminal, and a plurality of alternating layers of active electrodes extending inwardly from alternating ends of the ceramic capacitor body; a plurality of side shields disposed within the plurality of alternating layers of active electrodes to provide shielding; and a coating on the ceramic capacitor body to assist in increasing breakdown voltage.

A method of manufacturing a multilayer ceramic component, comprising forming a ceramic capacitor body from a plurality of electrode layers and dielectric layers; attaching first and second external terminals on opposite ends of the ceramic capacitor body; coating the ceramic capacitor body to assist in increasing breakdown voltage; wherein the plurality of electrode layers comprises layers of active electrodes and layers of shielding electrodes and wherein the layers of active electrodes being configured in an alternating manner such that a first of the plurality of active electrodes extends from one end of the ceramic capacitor body inwardly and a next internal active electrode extends from an opposite end of the ceramic capacitor body inwardly; wherein the layers of shielding electrodes comprise a top internal electrode shield and an opposite bottom internal electrode shield wherein the top internal electrode shield and the opposite bottom internal electrode shield are on opposite sides of the plurality of active electrodes and each electrode shield extends inwardly to or beyond a corresponding external terminal to thereby provide shielding; wherein the layers of active electrodes further comprise side shields to thereby provide additional shielding.

A multilayer ceramic capacitor component comprising a ceramic capacitor body having opposite ends and comprised of a plurality of electrode layers and dielectric layers; first and second external terminals attached to the ceramic capacitor body; a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly; a plurality of internal electrode shields within the ceramic capacitor body to thereby assist in providing resistance to arc-over; the plurality of internal electrode shields comprising a plurality of side shields, each side shield extending inwardly from one end of the capacitor body to thereby resist arc over between active electrodes and terminals; and a coating on the ceramic capacitor body to assist in increasing breakdown voltage.

A method of manufacturing a multilayer ceramic component, comprising forming a ceramic capacitor body from a plurality of electrode layers and dielectric layers; attaching first and second external terminals on opposite ends of the ceramic capacitor body; coating the ceramic capacitor body to assist in increasing breakdown voltage; wherein the plurality of electrode layers comprises active electrodes and shielding electrodes and wherein the active electrodes being configured in an alternating manner such that a first of the plurality of active electrodes extends from one end of the ceramic capacitor body inwardly and a next active electrode extends from an opposite end of the ceramic capacitor body inwardly; wherein the layers of active electrodes further comprise side shields to thereby provide shielding.

A method of manufacturing a multilayer ceramic component, comprising forming a ceramic capacitor body from a plurality of electrode layers and dielectric layers; attaching first and second external terminals on opposite ends of the ceramic capacitor body; coating the ceramic capacitor body to assist in increasing breakdown voltage; wherein the plurality of electrode layers comprises a plurality of active electrode layers being configured in an alternating manner such that a first end of the plurality of active electrodes extends from one end of the ceramic capacitor body inwardly and a next internal active electrode extends from an opposite end of the ceramic capacitor body inwardly; wherein the active electrode layer further comprise side shields to thereby provide additional shielding.

BRIEF DESCRIPTION OF THE DRAWINGS

FIG. 6 is a diagram of capacitor designs according to several embodiments of the present invention.

FIG. 7 is a table showing the average capacitance and dimensions for the capacitor designs of FIG. 6.

DETAILED DESCRIPTION OF THE PREFERRED EMBODIMENT

This invention describes a novel arrangement of internal electrodes that results in an arc resistant multilayer ceramic capacitor with very high voltage breakdown in air. Furthermore these designs retain a high capacitance. To assist in describing the present invention, each of three designs and MLCC performance is described and then a more detailed description of each example is provided with reference to the drawings. The designs and MLCC performance is described in the following examples.

Example 1

A standard case size 1206 capacitor design was manufactured using a production MLCC X7R materials system C-153.

Example 2

A case size 1206 capacitor design was manufactured using a production MLCC X7R materials system C-153 with shield electrodes on top and bottom. The purpose of these shield electrodes is to prevent an arc-over between the terminal and the internal electrode of opposite polarity or across the top or bottom surface of the capacitor between terminals of opposite polarity. For this reason it is only necessary to have one shield electrode present in the case where the active below is of opposite polarity. However, during the course of manufacturing capacitors of different values by shielding both terminal areas at the top and bottom of the capacitor there is no need to change the screens for different numbers of electrodes improving manufacturability.

Example 3

A case size 1206 capacitor design was manufactured using a production MLCC X7R materials system C-153 with side shield electrodes on either side of the active in additions to shield electrodes on top and bottom. The purpose of the side shield electrode is to prevent an arc-over between the terminal and different internal electrode layers of opposite polarity or across the sides of the capacitor between terminals of opposite polarity. As for the top and bottom side shield electrodes, two side shield electrodes on each side were used but it is only necessary to have one side shield electrode at the side of each layer with terminal of opposing polarity. The two side shield electrodes on each side allow to accurately check alignment of the electrode stack.

The design and electrode pattern for all three examples is shown in FIG. 6. Terminals were applied to these examples consisting of a thick film fired silver paste and these were then over plated with nickel followed by tin. The parts were screened through a 1000V Hi-Pot and IR verified. The average capacitances (n=100) and dimensions (n=5) were measured as shown in FIG. 7.

Figure 12A:
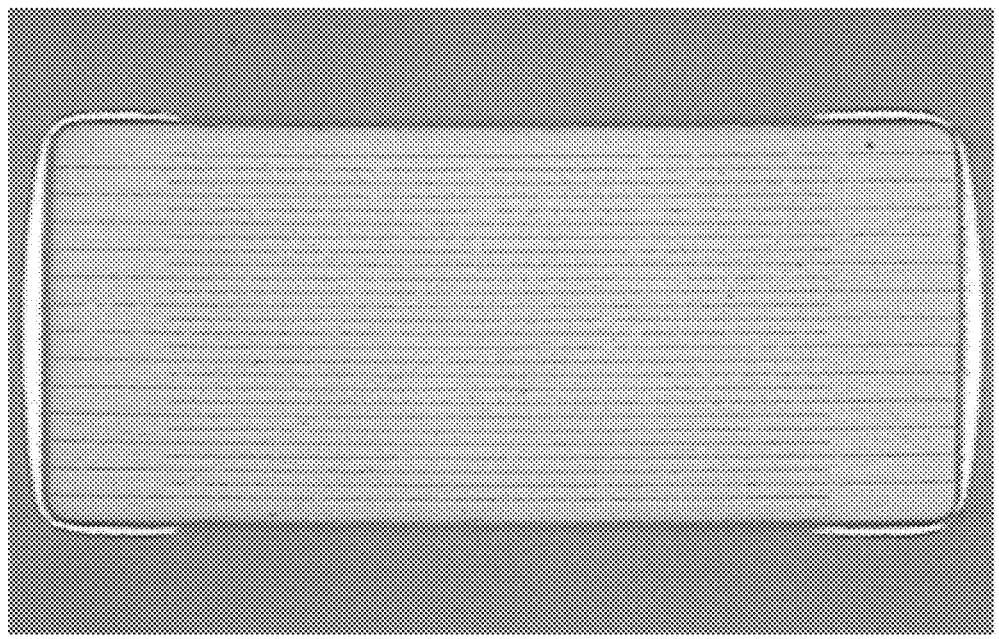
FIG. 12A is a photograph of a cross-section of Example 1.
Figure 12B:
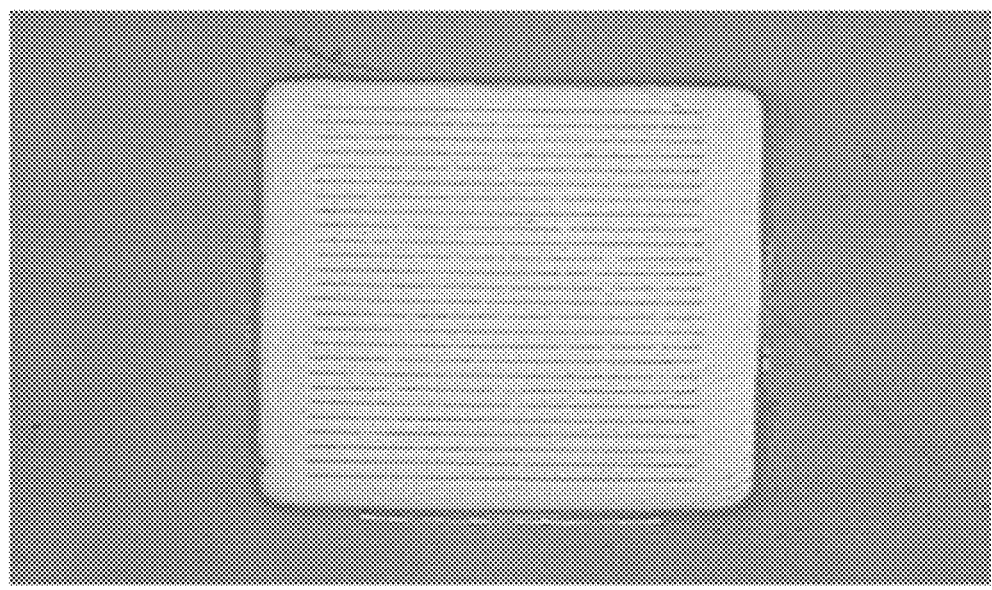
FIG. 12B is a photograph of an end view of the cross-section of Example 1.
Figure 13A:
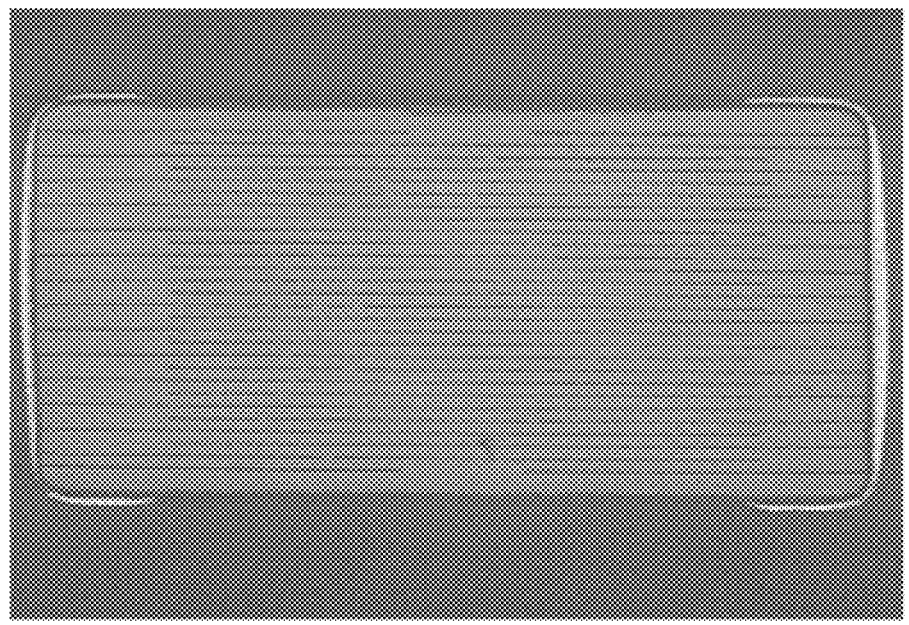
FIG. 13A is a photograph of a cross-section of Example 2.
Figure 13B:
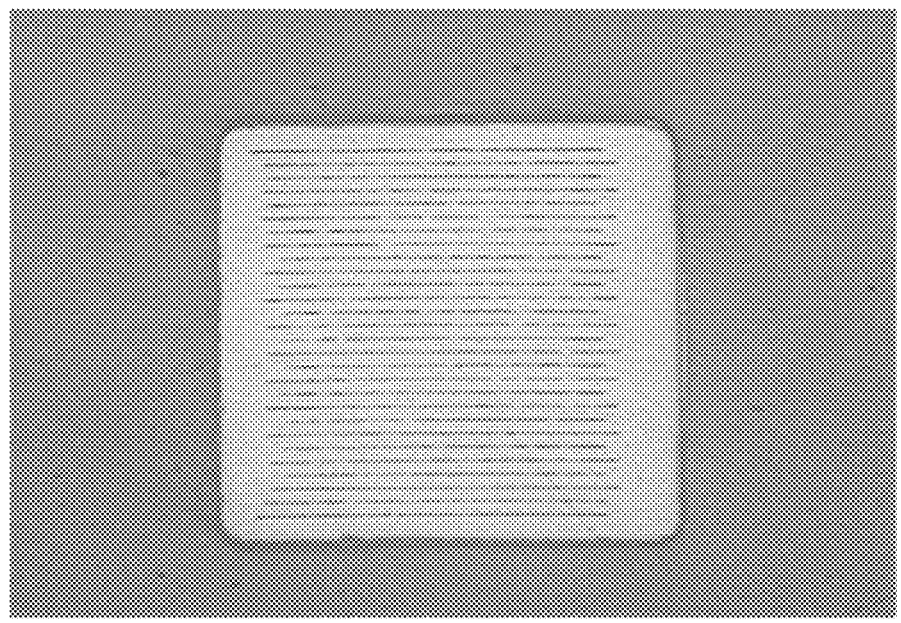
FIG. 13B is a photograph of an end view of the cross-section of Example 2.
Figure 14A:
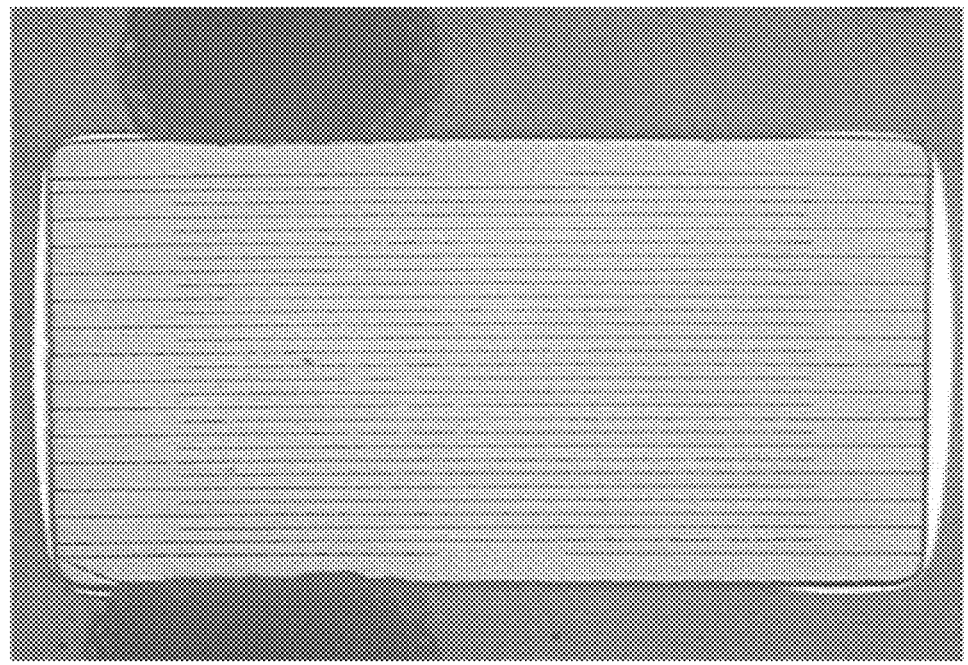
FIG. 14A is a photograph of a cross-section of Example 3.
Figure 14B:
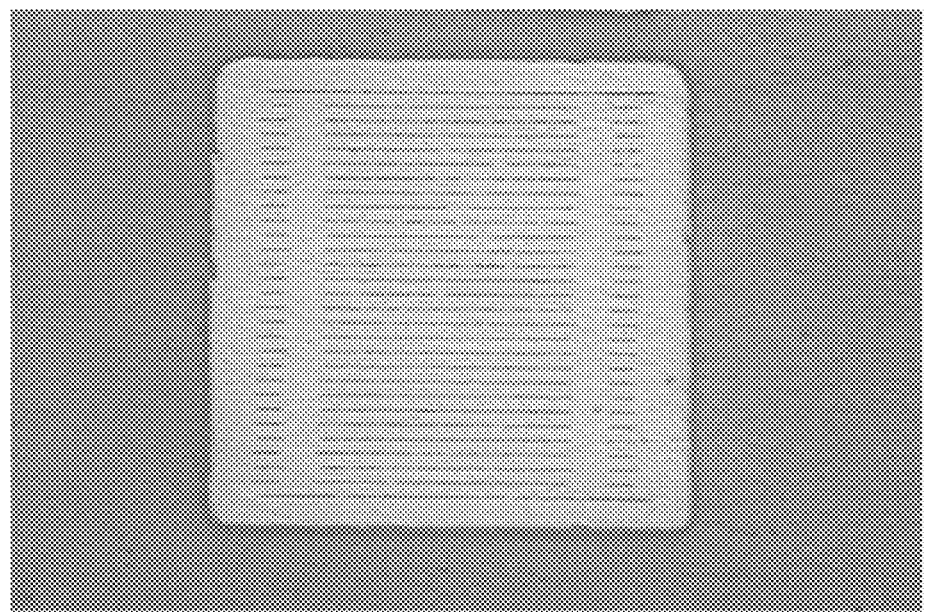
FIG. 14B is a photograph of an end view of the cross-section of Example 3.

It can be seen that the Number of Electrodes−1 (N) are almost the same for all these examples, 27±1. The Fired Active Thickness of Ceramic Separating the Layers (T) is also the same for all three examples and since the same ceramic material system was used to manufacture all the capacitors the Permittivity ($\in$r) is the same. The only variable affecting capacitance is therefore the Effective Overlap Area of Electrodes (A). This is lower for Example 3 because of the presence of the side-shields. The actual cross-sections of Examples 1, 2 and 3 are shown in FIGS. 12A and 12B (Example 1), FIGS. 13A and 13B (Example 2) and FIGS. 14A and 14B (Example 3)

Figure 11:
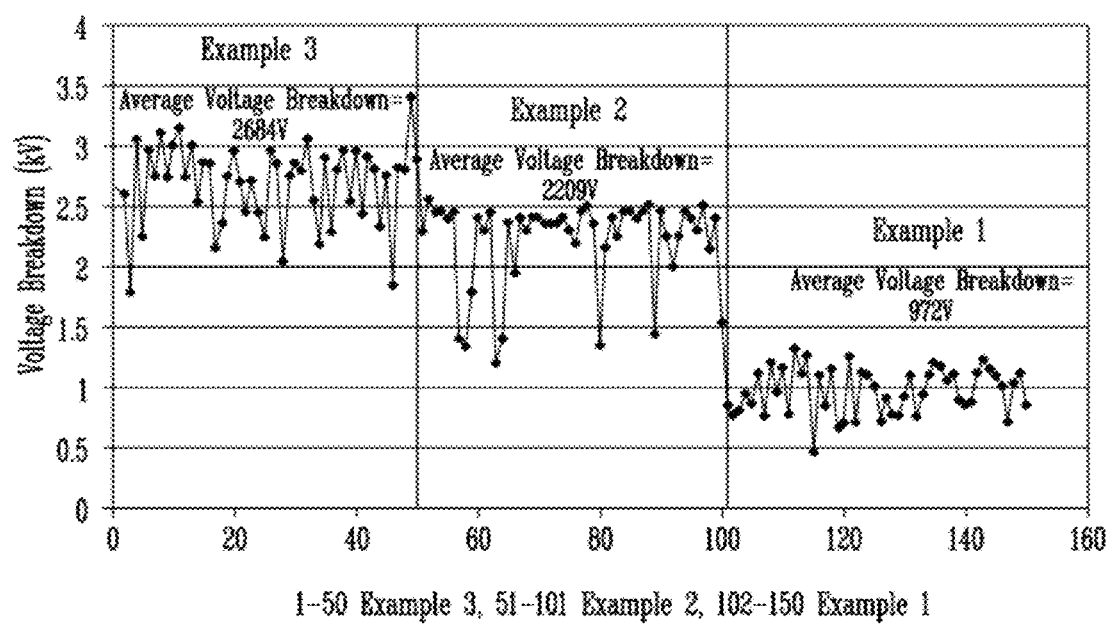
FIG. 11 shows a voltage breakdown of Examples 1, 2 and 3.

A sample of 50 capacitors for examples 1, 2 and 3 were tested to failure by applying voltage at a ramp rate of 500V/s per method 103 of EIA 198-2-E. The results are shown in FIG. 11. The instrument used for testing was the Associated Research 7512DT HiPot. Data of FIG. 11 represents dielectric breakdown voltage levels, which include arc-over and or physical destruction. Post IR testing of Example 1 parts had 13/50 Insulation Resistance (IR) failures, Examples 2 and 3 had 48/50 and 50/50 IR failures respectively indicating that failures due to arc-over were not observed in Example 3. It is also important to note that repeated arc-over occurrences on applying voltage would eventually cause IR failure.

It can clearly be seen that Example 3 has the highest average voltage breakdown >2.5 kV of the examples cited. The voltage breakdown and capacitance of the 1206 case size capacitor in Example 3 are similar to the 1812 1000V rated single floating electrode serial capacitors described in the prior art. The capacitors described in Example 3 therefore allow the circuits required to handle high voltages to be significantly miniaturized.

Figure 1:
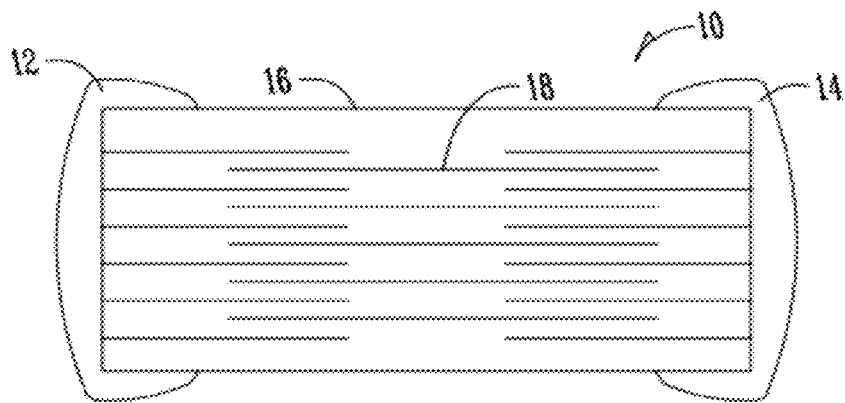
FIG. 1 is a diagram of a cross-section through a series capacitor design with a single floating electrode.
Figure 2:
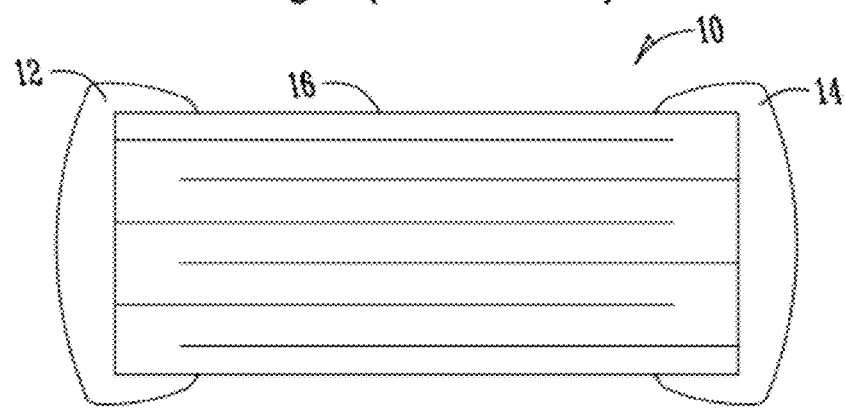
FIG. 2 is a diagram of a cross-section through a standard capacitor sign.
Figure 3:
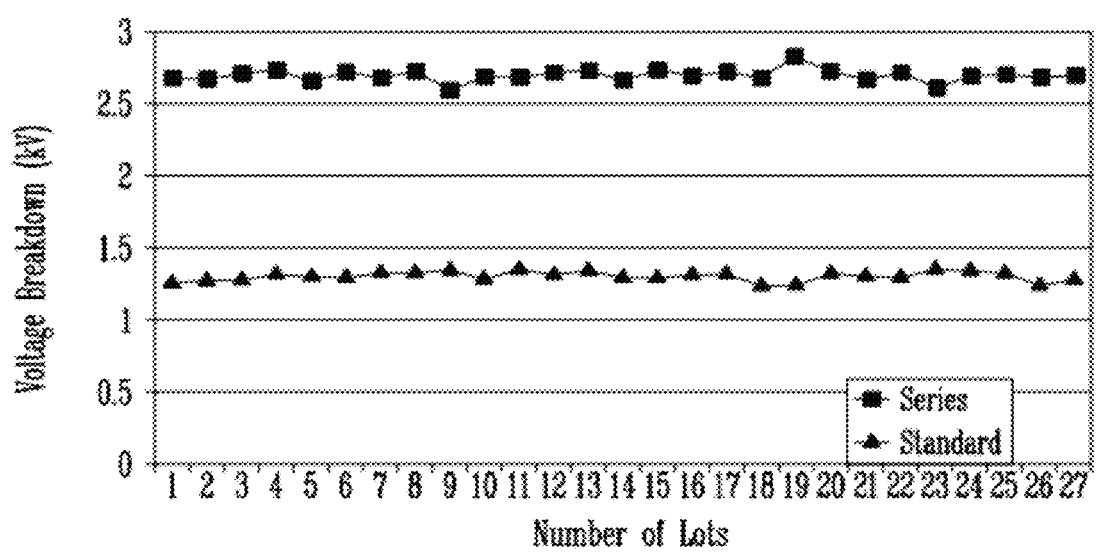
FIG. 3 shows an average voltage breakdown of series and standard capacitor designs.
Figure 4A:
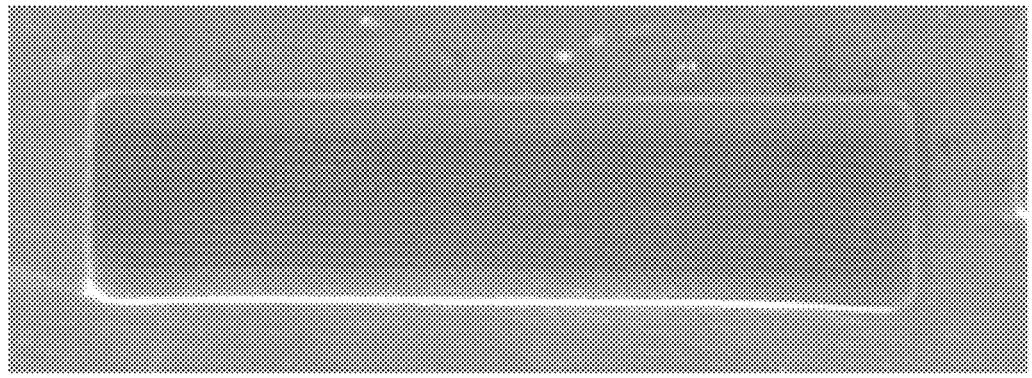
FIG. 4A shows a cross-section photograph of 1812 MLCC standard design.
Figure 4B:
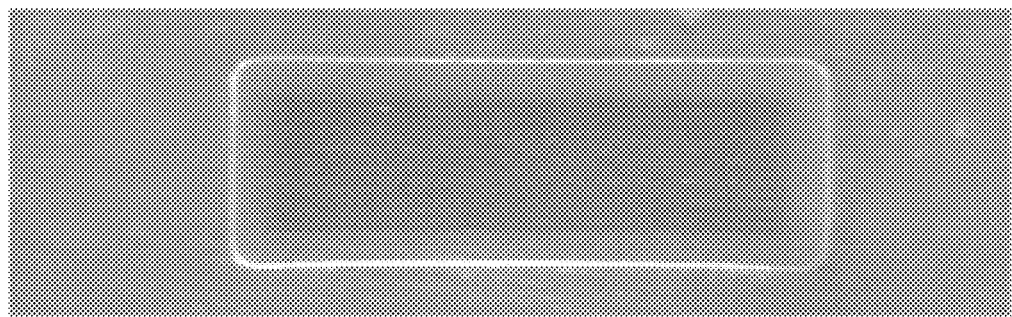
FIG. 4B shows an end view photograph of an 1812 MLCC standard design.
Figure 5A:
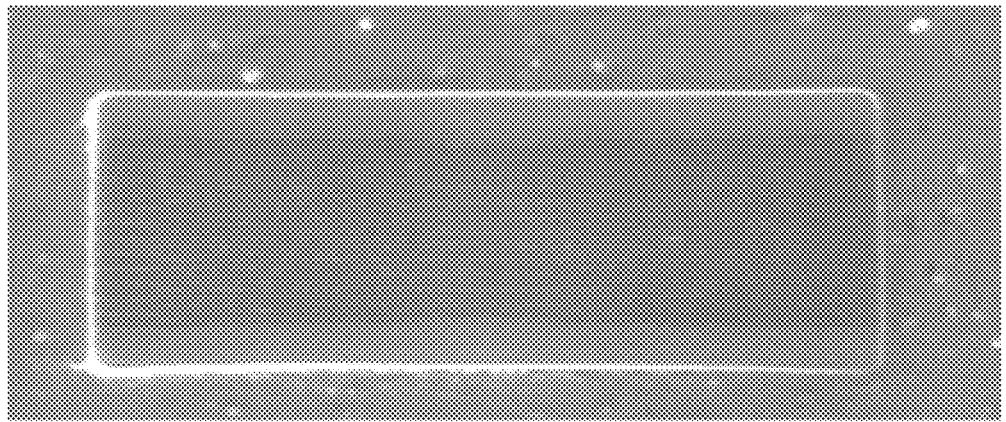
FIG. 5A is a cross-section photograph of 1812 MLCC single floating electrode series design.
Figure 5B:
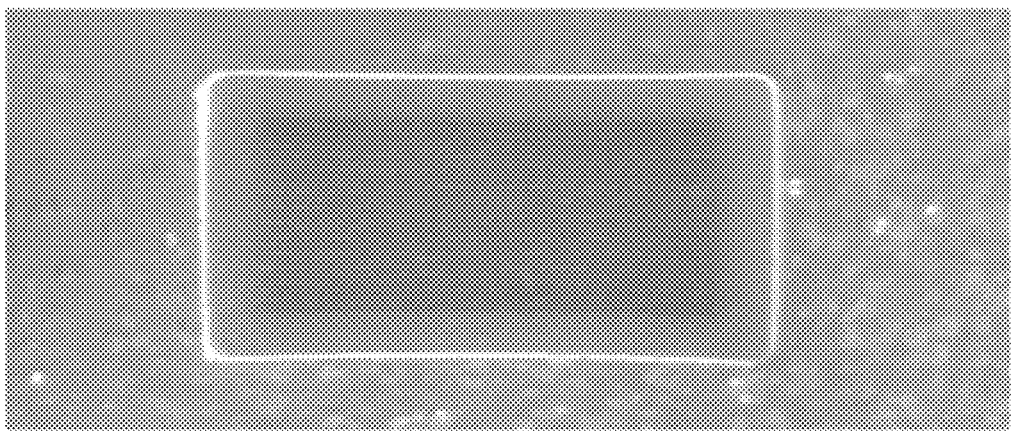
FIG. 5B shows an end view photograph of an 1812 MLCC single floating electrode series design.

FIG. 1 illustrates a prior art capacitor design. In FIG. 1, a capacitor 10 is shown with a first terminal 12 and an opposite second terminal 14 on the opposite end of the capacitor body 16. Floating electrodes 18 are shown. FIG. 2 illustrates another prior art capacitor design. In FIG. 2, instead of floating electrodes, the electrodes alternate. FIG. 3 compares the series and standard designs. In particular, FIG. 3 shows the average voltage breakdowns (n=50) for 27 lots of case size 1812 MLCCs, 47 nF±10 percent standard designs and the same number of case size 1812, 22 nF±10 percent single floating electrode series designs. In all these cases the fired active thickness separating the electrodes was 0.0023", 58 microns with an overall thickness of 0.051±0.003" (1.30±0.08 mm) for the standard design and 0.068±0.003" (1.73±0.08 mm) for the series capacitors. The length and width dimensions were 0.177±0.010" (4.50±0.25 mm) and 0.126±0.008" (3.20±0.20 mm) respectively for all these 1812 case size capacitors. Cross-sections of the 1812 standard design and the single electrode series design are shown in FIGS. 4A-4B and 5A-5B, respectively.

FIG. 6 is a table which shows three different capacitor design examples. The first example is a standard design used for comparison purposes. The second example is one embodiment of the present invention where top and bottom shields are used. The third example is another embodiment of the present invention where both top and bottom shields as well as side shields are used.

As shown in FIG. 6, in the standard design, the fired active thickness of the capacitor is 0.0020 inches or 51 microns. The standard design includes 26 active electrodes. In the top/bottom shield design, the fired active thickness of the capacitor is also 0.0020 inches or 51 microns. The top/bottom shield design includes 27 active electrodes. In the top/bottom and side shield design, the fired active thickness is 0.0020 inches or 51 microns. In the top/bottom side shield design there are 28 active electrodes.

FIG. 6 also shows the electrode layout plans for the various types of design. According to the standard design there is a first electrode 20 and a staggered second electrode 22. A third electrode 24 is aligned with the first electrode 20. A fourth electrode 26 is aligned with the second electrode 22. This alternating pattern continues, with additional alternating electrodes until the second to last electrode, N−1, and the last electrode 30.

In the top/bottom shield design the first electrode layer includes a first top shield 32 and a second top shield 34 as well as a first bottom shield 36 and a second bottom shield 38. It is of particular note that only the first top shield 32 and the second bottom shield 38 are active—the other shields need not even be present. The first top shield 32 and second bottom shield 38 are necessary to prevent arc-over from terminations of opposed polarity and shields 34 and 26 are present for manufacturing convenience.

In the top/bottom and side shields embodiment, there is a first top shield 32 and a second top shield 34 as well as a first bottom shield 36 and a second bottom shield 38. For each active electrode there are also side shields 40, 42, 44, 46, 48, 50, 52, 54, 56, 58, 60, 62, 64, 66, 68, and 70. The side shields 40, 42, 52, 54, 56, 58, 68, and 70 are required to protect the inner active electrodes from arc over from the termination of opposed polarity whereas the other side shields were included to test the electrode alignment within the parts.

Figure 8A:
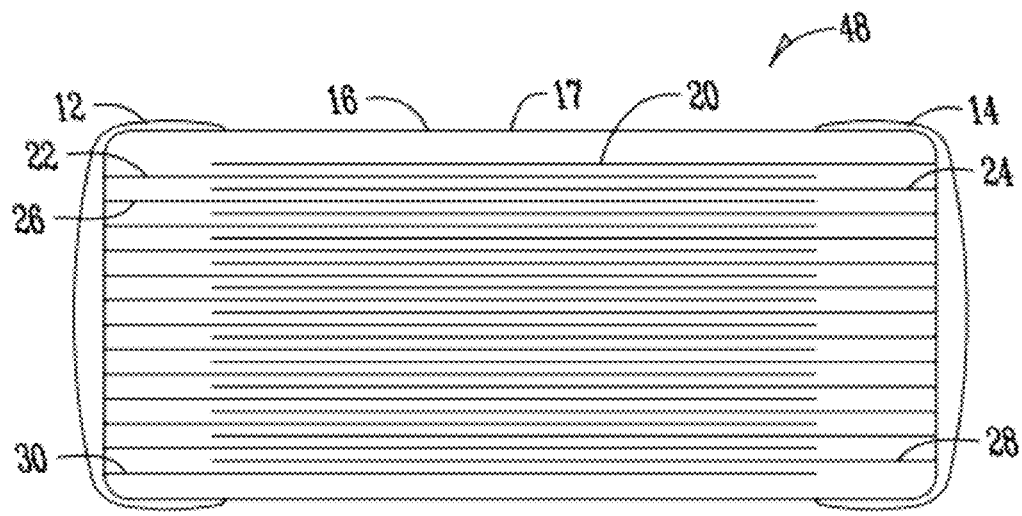
FIG. 8A is a side view cross-section drawing of Example 1.
Figure 8B:
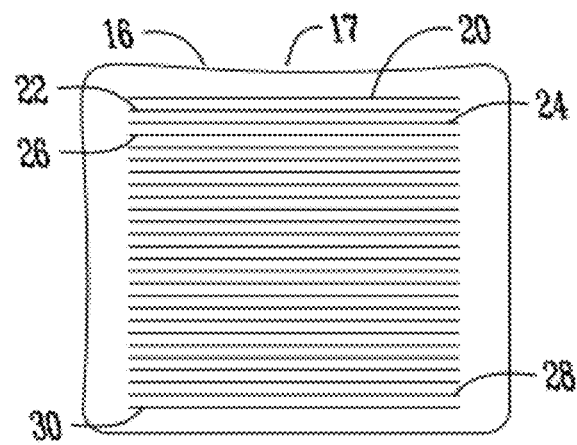
FIG. 8B is an end view cross-section drawing of Example 1.

The designs shown in FIG. 6 are further illustrated in FIGS. 8A to 10B. FIG. 8A is a cross-section of Example 1 (standard design) while FIG. 8B is an end view of the cross-section of Example 1. In FIG. 8A, a multilayer ceramic capacitor component 48 is shown with a first terminal 12 and a second terminal 14 on opposite ends of a multilayer ceramic capacitor component 16. The internal active electrodes of the ceramic capacitor body are configured in alternating manners such that a first internal active electrode 20 extends from one end of the ceramic capacitor body inwardly toward the terminal on the opposite end of the ceramic capacitor body. The next internal active electrode 22 extends from the opposite end of the ceramic capacitor body inwardly toward the terminal on the opposite end of the ceramic body. A coating 17 may be used to further assist in increasing breakdown voltage. The end view cross-section of FIG. 8B illustrates the electrodes.

Figure 9A:
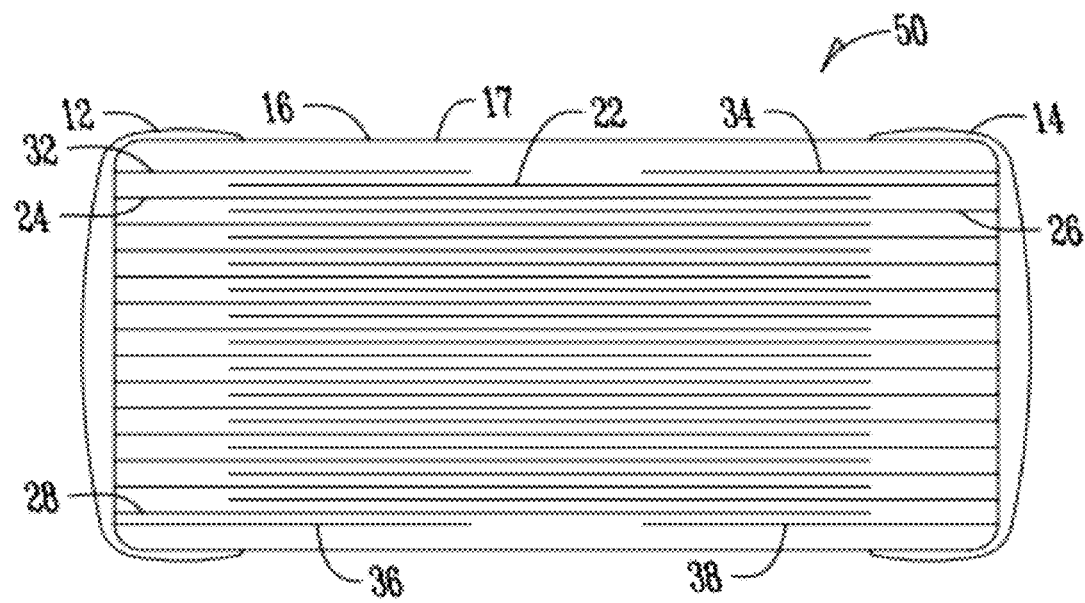
FIG. 9A is a side view cross-section drawing of Example 2.
Figure 9B:
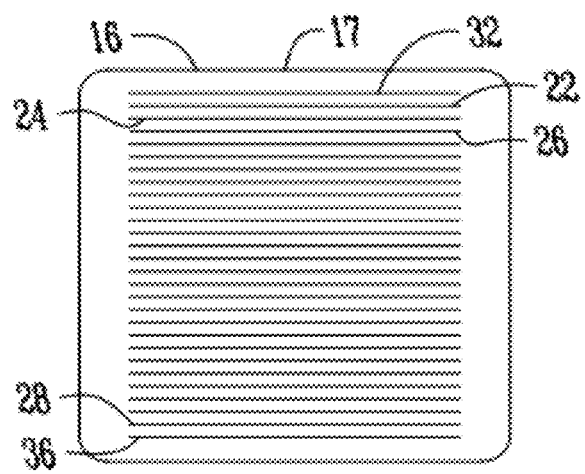
FIG. 9B is an end view cross-section drawing of Example 2.

FIG. 9A is a side view cross-section of Example 2 (top/bottom shields) while FIG. 9B is an end view of the cross-section of Example 2. In FIG. 9A, a multilayer ceramic capacitor component 50 is shown. Note the presence of the internal electrode shields within the ceramic capacitor body which assist in providing resistance to arc-over between the terminals and internal electrodes. The internal electrode shields shown include a top internal electrode shield 32 and an opposite bottom internal electrode shield 38. The top internal electrode shield 32 and the opposite bottom internal electrode shield 38 are on opposite sides of the multilayer ceramic capacitor body 16. Each internal electrode shield 32, 38 extends inwardly to or beyond a corresponding terminal 12, 14 to thereby provide shielding. As previously mentioned, additional structures 34, and 36 are provided but are not required as they do not provide actual shielding due to the polarity of the terminals. They are included for convenience in the manufacturing process. In addition, a coating 17 may be used to further assist in increasing breakdown voltage.

Figure 10A:
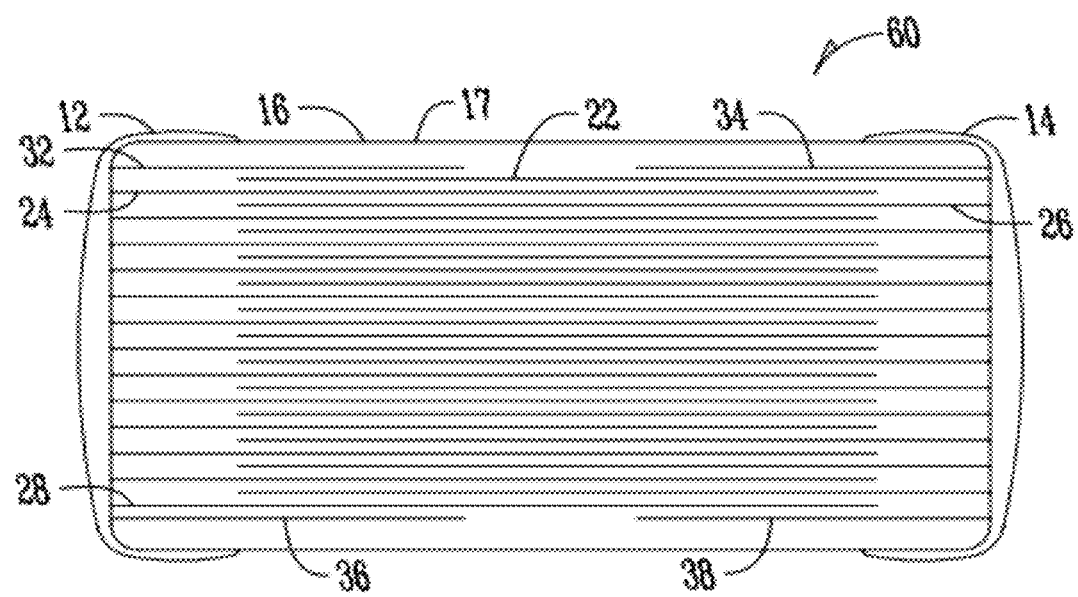
FIG. 10A is a side view cross-section drawing of Example 3.
Figure 10B:
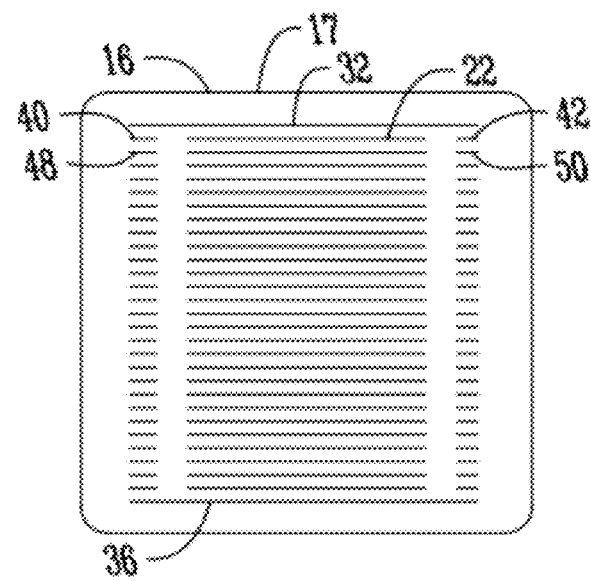
FIG. 10B is an end view cross-section drawing of Example 3.

FIG. 10A is a side view cross-section of Example 3 (top/bottom shields and side shield) while FIG. 10B is an end view of the cross-section of Example 3. The multilayer ceramic capacitor 60 of FIG. 10A includes not only the top shield 32 and opposite bottom shield 38, but also side shields. The side shields are best shown in FIG. 10B that depicts a cross-section through the capacitor. The side shield in question depends on the depth of the cross-section hence the side shields shown are 40, 42, 48, and 50.

FIG. 7 provides a table for comparing the standard design to two designs according to the present invention. The table shows the average capacitance and dimensions for the capacitor designs of FIG. 6.

FIG. 11 shows a voltage breakdown of Examples 1, 2 and 3. Note that in FIG. 11, the top/bottom shield embodiment (Example 2) provides increased voltage break down relative to the standard design (Example 1). The top/bottom and side shield embodiment (Example 3) provides further increased break down voltage. Thus, the present invention can be used to create multi-layer ceramic capacitors having voltage breakdowns above 1000 V, 1500 V, 2000V, 2500 V, or even 3000V.

The present invention further contemplates that a coating may be used to further improve voltage breakdown performance. In particular, a coating such as a polyimide coating may be used for improved voltage breakdown performance. The coating may be spin coated. Testing may be performed by subjecting the capacitor to voltage breakdown testing in air after applying and curing a polyimide coating on the ceramic surface. The use of the coating assists in increasing breakdown voltage. As standard multilayer ceramic capacitor component of 100 nf capacitance and 1812 package size was subjected to voltage breakdown testing in air both with and without coating with polyimide using spin coating techniques. The uncoated capacitors had an average voltage breakdown of 1.27 RVDC while the coated capacitors had an average breakdown voltage of 2.46 RVDC. Thus, the use of the polyimide resulted in a significant improvement in breakdown voltage.

Therefore an improved high voltage capacitor has been disclosed. The present invention is not to be limited to the specific embodiments shown in here. For example, the present invention contemplates numerous variations in the types of dielectric used, types of conductors used, sizes, dimensions, packaging, and other variations.

What is claimed is:

1. A multilayer ceramic capacitor component comprising:
a ceramic capacitor body having opposite ends and comprised of a plurality of electrode layers and dielectric layers;
first and second external terminals attached to the ceramic capacitor body;
a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
a plurality of internal electrode shields within the ceramic capacitor body to thereby assist in providing resistance to arc-over;
the plurality of internal electrode shields comprising a top internal electrode shield and an opposite bottom internal electrode shield wherein the top internal electrode shield and the opposite bottom internal electrode shield are on opposite sides of the plurality of internal active electrodes and each internal electrode shield extends inwardly to or beyond a corresponding external terminal to thereby provide shielding;
the plurality of internal electrode shields further comprising a plurality of side shields, each side shield extending inwardly from one end of the capacitor body and the side shields configured to further shield an active electrode to thereby further resist arc over between active electrodes and terminals, wherein at least one of the top internal electrode shield or the bottom internal electrode shield extends over the plurality of side shields; and
a coating on the ceramic capacitor body to assist in increasing breakdown voltage.

2. The multilayer ceramic capacitor component of claim 1 wherein each of the plurality of internal active electrodes extends from one end of the ceramic capacitor body substantially to the external electrode attached to the opposite end of the ceramic capacitor body.

3. The multilayer ceramic capacitor component of claim 1 wherein the voltage breakdown for the multilayer ceramic capacitor is greater than 1500 volts.

4. The multilayer ceramic capacitor component of claim 1 wherein the voltage breakdown for the multilayer ceramic capacitor is greater than 2000 volts.

5. The multilayer ceramic capacitor component of claim 1 wherein the voltage breakdown for the multilayer ceramic capacitor is greater than 2500 volts.

6. The multilayer ceramic capacitor component of claim 1 wherein the voltage breakdown for the multilayer ceramic capacitor is greater than 3000 volts.

7. The multilayer ceramic capacitor component of claim 1 wherein the coating comprises polyimide.

8. A multilayer ceramic capacitor component for providing improved high voltage characteristics, comprising:
a ceramic capacitor body having opposite ends and comprised of a plurality of electrode layers and dielectric layers;
first and second external terminals attached to the ceramic capacitor body;
wherein the plurality of electrode layers comprise a top layer having an electrode shield extending inwardly to or beyond the first terminal, a bottom layer having an electrode shield extending inwardly to or beyond the second terminal, and a plurality of alternating layers of active electrodes extending inwardly from alternating ends of the ceramic capacitor body;
wherein each of the plurality of alternating layers of active electrodes further comprises side shields, and at least one of the electrode shield extending inwardly to or beyond the first terminal and the electrode shield extending inwardly to or beyond the second terminal extends over the side shields; and
a coating on the ceramic capacitor body to assist in further increasing the voltage breakdown.

9. The multilayer ceramic capacitor component of claim 8 wherein the voltage breakdown for the multilayer ceramic capacitor is greater than 1500 volts.

10. The multilayer ceramic capacitor component of claim 8 wherein the voltage breakdown for the multilayer ceramic capacitor is greater than 2000 volts.

11. The multilayer ceramic capacitor component of claim 8 wherein the voltage breakdown for the multilayer ceramic capacitor is greater than 2500 volts.

12. The multilayer ceramic capacitor component of claim 8 wherein the voltage breakdown for the multilayer ceramic capacitor is greater than 3000 volts.

13. The multilayer ceramic capacitor component of claim 8 wherein the ceramic capacitor body being sized to fit within case size 1206 packaging.

14. The multilayer ceramic capacitor component of claim 8 wherein the coating comprises polyimide.

15. The multilayer ceramic capacitor component of claim 8 wherein the coating is spin coated.

16. A multilayer ceramic capacitor component comprising:
a ceramic capacitor body having opposite ends and comprised of a plurality of electrode layers and dielectric layers;
first and second external terminals attached to the ceramic capacitor body;
a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
a plurality of internal electrode shields within the ceramic capacitor body to thereby assist in providing resistance to arc-over;
the plurality of internal electrode shields comprising a plurality of side shields, each side shield extending inwardly from one end of the capacitor body and the side shields configured to shield a corresponding active electrode to thereby resist arc over between active electrodes and terminals, wherein at least one of the internal electrode shields extends over the plurality of side shields; and
a coating on the ceramic capacitor body to assist in increasing breakdown voltage.

17. The multilayer ceramic capacitor component of claim 16 wherein the plurality of internal electrode shields further comprises a top internal electrode shield and an opposite bottom internal electrode shield wherein the top internal electrode shield and the opposite bottom internal electrode shield are on opposite sides of the plurality of internal active electrodes and each internal electrode shield extends inwardly to or beyond a corresponding external terminal to thereby provide shielding.

18. The multilayer ceramic capacitor component of claim 16 wherein the coating comprises polyimide.

19. The multilayer ceramic capacitor component of claim 16 wherein the coating is spin coated.

20. A multilayer ceramic capacitor component comprising:
a ceramic capacitor body having opposite ends and comprised of a plurality of electrode layers and dielectric layers;
first and second external terminals attached to the ceramic capacitor body;
a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;
a plurality of internal electrode shields within the ceramic capacitor body to thereby assist in providing resistance to arc-over;
each of the internal electrode shields extends inwardly to or beyond a corresponding external terminal to thereby provide shielding;
the plurality of internal electrode shields comprising a plurality of side shields, each side shield extending inwardly from one end of the capacitor body and the side shields configured to shield the internal active electrode to thereby further resist arc over between the internal active electrodes and the terminals, wherein at least one of the internal electrode shields extends over the plurality of side shields; and
a coating on the ceramic capacitor body to assist in increasing breakdown voltage.

21. The multilayer ceramic capacitor component of claim 20 wherein the plurality of side shields alternate between the opposite ends of the capacitor body.

22. The multilayer ceramic capacitor component of claim 20 wherein the plurality of internal electrode further comprising a top internal electrode shield and an opposite bottom internal electrode wherein the top internal electrode shield and the bottom internal electrodes shield are on opposite sides of the plurality of internal electrodes.

23. The multilayer ceramic capacitor component of claim 20 wherein each of the plurality of internal active electrodes extends from one end of the ceramic capacitor body substantially to the external electrode attached to the opposite end of the ceramic capacitor body.

24. The multilayer ceramic capacitor component of claim 20 wherein the voltage breakdown for the multilayer ceramic capacitor is greater than 1500 volts.

25. The multilayer ceramic capacitor component of claim 20 wherein the voltage breakdown for the multilayer ceramic capacitor is greater than 2000 volts.

26. The multilayer ceramic capacitor component of claim 20 wherein the voltage breakdown for the multilayer ceramic capacitor is greater than 2500 volts.

27. The multilayer ceramic capacitor component of claim 20 wherein the voltage breakdown for the multilayer ceramic capacitor is greater than 3000 volts.

28. The multilayer ceramic capacitor component of claim 20 wherein the coating comprises polyimide.

29. The multilayer ceramic capacitor component of claim 20 wherein the coating is spin coated.

30. A multilayer ceramic capacitor component for providing improved high voltage characteristics, comprising:
a ceramic capacitor body having opposite ends and comprised of a plurality of electrode layers and dielectric layers;
first and second external terminals attached to the ceramic capacitor body;
wherein the plurality of electrode layers comprise a top layer having an electrode shield extending inwardly to or beyond the first terminal, a bottom layer having an electrode shield extending inwardly to or beyond the second terminal, and a plurality of alternating layers of active electrodes extending inwardly from alternating ends of the ceramic capacitor body;
a plurality of side shields disposed within the plurality of alternating layers of active electrodes to provide shielding, wherein at least one of the electrode shield extending inwardly to or beyond the first terminal and the electrode shield extending inwardly to or beyond the second terminal extends over the side shields; and a coating on the ceramic capacitor body to assist in increasing breakdown voltage.

31. The multilayer ceramic capacitor of claim 30 wherein each of the alternating layers of active electrodes includes a side shield.

32. The multilayer ceramic capacitor component of claim 30 wherein the voltage breakdown for the multilayer ceramic capacitor is greater than 1500 volts.

33. The multilayer ceramic capacitor component of claim 30 wherein the voltage breakdown for the multilayer ceramic capacitor is greater than 2000 volts.

34. The multilayer ceramic capacitor component of claim 30 wherein the voltage breakdown for the multilayer ceramic capacitor is greater than 2500 volts.

35. The multilayer ceramic capacitor component of claim 30 wherein the voltage breakdown for the multilayer ceramic capacitor is greater than 3000 volts.

36. The multilayer ceramic capacitor component of claim 30 wherein the ceramic capacitor body being sized to fit within case size 1206 packaging.

37. The multilayer ceramic capacitor component of claim 30 wherein the coating comprises polyimide.

38. The multilayer ceramic capacitor component of claim 30 wherein the coating is spin coated.

39. A multilayer ceramic capacitor component comprising:

a ceramic capacitor body having opposite ends and comprised of a plurality of electrode layers and dielectric layers;

first and second external terminals attached to the ceramic capacitor body;

a plurality of internal active electrodes within the ceramic capacitor body configured in an alternating manner such that a first of the plurality of internal active electrodes extends from one end of the ceramic capacitor body inwardly and a next internal active electrode extends from an opposite end of the ceramic capacitor body inwardly;

a plurality of internal electrode shields within the ceramic capacitor body to thereby assist in providing resistance to arc-over;

the plurality of internal electrode shields comprising a plurality of side shields, each side shield extending inwardly from one end of the capacitor body to thereby resist arc over between active electrodes and terminals, wherein at least one of the internal electrode shields extends over the plurality of side shields; and a coating on the ceramic capacitor body to assist in increasing breakdown voltage.

40. The multilayer ceramic capacitor component of claim 39 wherein the plurality of internal electrode shields further comprises a top internal electrode shield and an opposite bottom internal electrode shield wherein the top internal electrode shield and the opposite bottom internal electrode shield are on opposite sides of the plurality of internal active electrodes and each internal electrode shield extends inwardly to or beyond a corresponding external terminal to thereby provide shielding.

* * * * *